Aug. 5, 1930.  W. F. KASPER  1,772,008
BEARING KEY
Filed April 4, 1925
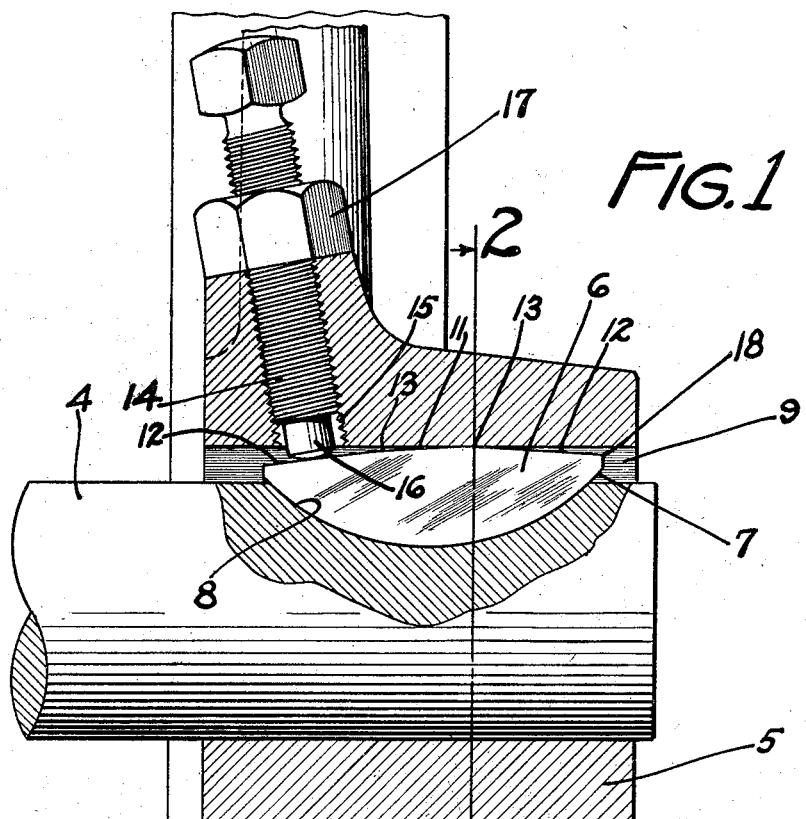
*Fig.1*
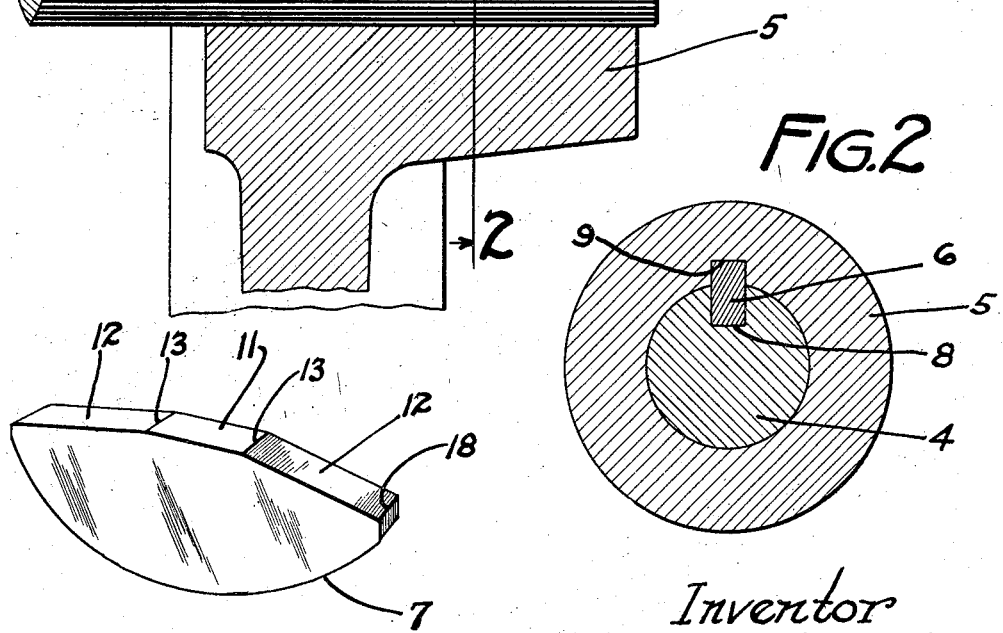
*Fig.2*
*Fig.3*
Inventor
WALTER F. KASPER
By Paul, Paul & Moore
Attorneys Patented Aug. 5, 1930

1,772,008

UNITED STATES PATENT OFFICE

WALTER F. KASPER, OF FAIRMONT, MINNESOTA, ASSIGNOR TO FAIRMONT RAILWAY MOTORS, INC., OF FAIRMONT, MINNESOTA, A CORPORATION OF MINNESOTA

BEARING KEY

Application filed April 4, 1925. Serial No. 20,807.

This invention relates to improvements in bearing keys and more particularly to an improved means for locking a bearing key so that it may be quickly and easily released to permit separation of the two members keyed together.

An object of the invention is to provide an improved bearing key-member so constructed and shaped that it may readily and quickly be released from locking position without the necessity of driving with a hammer, as is common when using standard types of keys such as tapered and straight keys, and yet which key-member, when wedged between two parts, will firmly lock such parts together for operation as a unit.

A further object of the invention is to provide such a key-member having the wedging action of a taper key and also having the advantage of being easily removed from its seat similar to the well-known type of Woodruff key.

A further object is to provide an arcuately formed key member adapted to be seated in a circular seat and having means for rocking it in its seat to securely lock two members together.

Other objects of the invention will appear from the following description and the accompanying drawings and will be pointed out in the annexed claims.

In the accompanying drawings forming part of this specification there has been disclosed a structure designed to carry out the various objects of the invention, but it is to be understood that the invention is not confined to the exact features shown as various changes may be made within the scope of the claims which follow.

In the accompanying drawings forming part of this specification:

Figure 1 is a sectional view showing a hub mounted upon a shaft and keyed thereto by the improved key-member;

Figure 2 is a detail sectional view on the line 2—2 of Figure 1;

Figure 3 is a perspective view of the key-member removed from its seat.

In the selected embodiment of the invention here shown, for purposes of disclosure, there is illustrated a shaft 4 having a hub 5 mounted thereon. This hub may be of any ordinary device such as a pulley, gear, or similar contrivance, which is adapted to be mounted upon a shaft.

An important feature of this invention resides in the novel means provided for locking the hub or member 5 to the shaft 4. Such means preferably consists in the provision of a key-member 6 having a curved or arcuately-formed face 7 adapted to be seated in a correspondingly shaped key-seat 8 provided in the shaft 4. The general outline of the key-member 6 is similar to that of the well-known type of Woodruff key. A keyway 9 is provided in the hub 5 adapted to receive the projecting portion of the key-member 6 in a manner similar to that employed when using standard types of keys.

As shown in Figure 3, the key-member 6 preferably has a flat face 11 centrally provided on the upper edge thereof and which face is interposed between the inclined faces 12 extending therefrom to the ends of the key as shown. The upper edge of the key-member 6 is preferably cut away as shown by the inclined faces 12 to provide clearance between the ends of the key-member and the bottom of the keyway 9 in order that one of the junctures or ridges 13 between the faces 12 and the face 11 may be brought into contact with the bottom of the keyway 9, as shown in Figure 1, thereby to firmly lock the hub 5 to the shaft 4. A setscrew 14 is mounted in a threaded socket 15 in the hub 5 and is adapted to have its lower end 16 moved into engagement with one of the upper inclined faces 12 of the key-member 6, as shown in Figure 1. When the setscrew 14 is downwardly rotated in the socket 15 against the key-member 6, the latter will be rotated in the keyseat 8, thereby causing one of the ridges 13 to be moved into contact with the bottom of the keyway 9, causing the key-member to be firmly wedged between the bottom of the keyseat 8 in the shaft 4 and the bottom of the keyway 9, with the resultant locking together of the shaft 4 and hub 5. A locknut 17 is preferably mounted upon the setscrew 14 whereby the latter may be locked in its adjusted positions as shown in Figure 1.

When it is desired to remove the hub 5 from the shaft 4, the locknut 17 will be released after which the setscrew 14 may be rotated in the socket 15 until the end-portion 16 thereof is moved out of engagement with the upper inclined face 12 of the key-member 6. After the setscrew 14 has thus been moved out of engagement with the key-member, the latter will tend to assume its normal position after which the hub member may readily be removed from the shaft 4.

By the employment therefore of this novel locking device, or key-member in conjunction with two members adapted to be locked together, it will readily be seen and understood that by means of the setscrew 14, two such members may be securely locked together as the action imparted to the key-member by the pressure of the screw 14 thereagainst, will be similar to the wedging action of a tapered key. Also as a result of the key-member being similar in outline to an ordinary Woodruff key, it will readily release its grip or locking engagement with the bottom of the keyway 9 when the setscrew 14 is rotated to release the pressure thereagainst. Thus it will readily be seen that when the setscrew 14 is moved out of engagement with the key-member 6, the two members may readily be separated from each other.

The amount of pressure required against the key-member 6 to firmly lock two members together, may be determined by the length of the flat face 11 upon the upper edge thereof. This may be readily understood by referring to Figure 1 wherein it will be noted that the ridge 13 at the right hand side of the key-member 6 is in contact with the bottom of the keyway 9 and is firmly forced thereagainst by downward pressure of the screw 14 against the key-member. Should the upper edge of the key-member not be cut away, as indicated by the inclined faces 12, then the outer corner 18 of the key-member would engage the bottom of the keyway 9 which would decrease the leverage action of the key-member against the hub 5, the greater pressure would therefore be required against the key-member by the setscrew 14 in order to securely lock the two members together. By cutting away the upper edge of the key-member as shown by the inclined faces 12, the point of contact between the key-member and the bottom of the keyway 9 will be moved relatively closer to the setscrew, thereby greatly increasing the leverage with a resultant decrease in the amount of pressure required against the key-member by the setscrew to firmly wedge it between the shaft and hub member 5. Also by cutting away both ends of the key-member as indicated by the inclined faces 12, no particular care need be exercised in mounting the key-member in the keyseat 8 as both ends of the key will be symmetrical.

Instead of forming the upper edge of the key with the faces 1 and 12, and the ridges 13, this edge may be arcuately formed or curved so as to be coincident with the arc of a circle. When thus formed and pressure is brought to bear upon the end of the key by the set screw, a portion of the upper curved edge thereof will engage the bottom of the keyway 9, thereby locking the two members together. This would seem to be an obvious modification of the structure shown in Figure 3 and I have not thought it necessary, therefore, to illustrate it in detail herein.

I claim as my invention:

1. A shaft having a curved bottom key seat, and a key having a convex side slidable against the curved bottom, and having its opposite side also convex, a member on said shaft having a straight key seat engaged by the key, said key being of less width than the greatest combined depths of the seats to permit rocking of the key, and a jamb screw in the member engaging with one end of the key and forcibly securing the hub in position on the shaft.

2. A shaft and a hub mounted thereon, the shaft and hub having key-ways which are in register, one of the key ways having a curved bottom, a key having a convex side slidable against said curved bottom, said key being of a depth less than the combined depth of the seats to permit rocking of the key, and a jamb screw carried by the hub and engaging the key at one side of its longitudinal middle, whereby the key can be forcibly rocked by said screw to secure the hub against rotative and axial movement.

In witness whereof, I have hereunto set my hand this 30th day of March, 1925.

WALTER F. KASPER.